United States Patent [19]

Zorn

[11] 4,004,081
[45] Jan. 18, 1977

[54] OPTICAL VIDEODISC PICKUP ARM WITH MOVING COIL DRIVE MEANS

[75] Inventor: Karl-Ludwig Zorn, Berlin, Germany

[73] Assignee: Robert Bosch G.m.b.H., Stuttgart, Germany

[22] Filed: June 6, 1974

[21] Appl. No.: 477,476

[30] Foreign Application Priority Data

July 20, 1973 Germany .................... 2337015

[52] U.S. Cl. .................... 358/128; 179/100.3 V; 274/41.6 S; 274/23 R; 358/130
[51] Int. Cl.² .................... H04N 5/76
[58] Field of Search ............ 179/100.3 V, 100.3 T, 179/100.3 H, 100.3 L, 100.41 L; 360/102, 103; 178/6.6 R, 6.6 DD, 6.7 A; 274/41.6 S, 23 R; 350/296

[56] References Cited

UNITED STATES PATENTS

| | | | |
|---|---|---|---|
| 1,917,003 | 7/1933 | Williams | 179/100.3 V |
| 3,123,677 | 3/1964 | Lauxen | 360/103 |
| 3,391,255 | 7/1968 | Gregg | 179/100.3 V |
| 3,530,258 | 9/1970 | Gregg | 179/100.3 V |
| 3,829,622 | 8/1974 | Elliot | 360/103 |

FOREIGN PATENTS OR APPLICATIONS 720,963   11/1965   Canada .................... 179/100.41 L Primary Examiner—Bernard Konick
Assistant Examiner—Alan Faber
Attorney, Agent, or Firm—William R. Woodward

[57] ABSTRACT

The arm carrying the optical head that projects and focuses a light beam onto a record trace on a video disc record is provided with a tracking movement by mounting the arm on an electromagnetically driven moving coil system that produces torque, driving the arm radially of the disc in accordance with a combination of coarse and fine tracking correction signals. The light beam is deflected by mirrors both at the pivot of the arm and at its extremity. The mirror at the arm extremity is either associated with a focusing lens or else provided with a parabolic curvature so that the light beam will be narrowed to a spot on the record trace. For transparent records, a photocell on the other side of the record disc is carried on a second arm mounted on the same torque-producing moving coil system in a manner elastically rather than rigidly coupled to the moving coil structure. In a system for opaque discs, the arm extremity deflecting mirror is a half mirror and the photocell is mounted behind the half mirror.

5 Claims, 3 Drawing Figures

OPTICAL VIDEODISC PICKUP ARM WITH MOVING COIL DRIVE MEANS

This invention relates to an optical pickup for a videodisc recording for reading the picture information recorded on a trace on the disc, using for that purpose a beam of light and a photocell.

Systems for recording information, for example, picture or sound information, on a rotating disc and for reproducing such information therefrom are known, in which the pickup of the information is performed optically. In particular, equipment for reproducing television signals in this fashion are known. These are recorded on a disc in an unusually dense sequence on a spiral trace, in order to pack as great a quantity as possible on a disc that does not significantly exceed in size the usual size of phonograph records. In such cases, a trace width less than 2 microns and a trace spacing of less than 4 microns is used. In this system, considerable micromechanical difficulties are found in guiding the pickup head which directs the light beam onto the disc so that it continuously follows the trace. Among others, the following problems arise: The focus of the light ray must be made to follow the record disc when the latter makes an unintended axial movement, so that the limits of the depth of focus of the focusing system that is used will not be exceeded. Furthermore, the focussed spot must under all conditions follow the recorded spiral trace in the radial direction. This radial movement can be resolved into the following components: An intended uniform movement during playback; a periodic movement, which is harmonic in the first approximation, in the case of a trace that is eccentrically located on the disc; and, finally, anharmonic components that can be caused, for example, by the bearing play of the drive mechanism.

The problem of maintaining the focus of the light ray within the limits of the depth of focus of the focusing system has been dealt with in an earlier application owned commonly with the present application and has been solved by the use of an air-supported bearing for the optical head.

The problem of the radial guidance for following the trace has been disclosed in German published patent application (OS) No. 1,499,774. It was there recommended to move the focusing optical elements on a carriage in the radial direction. The carriage in this arrangement is driven from a precision lead screw rigidly connected with the drive mechanism. In that manner, a uniform radial advance of the light spot was intended without requiring the spot to be further guided into the trace. It is necessary, however, to provide a supplementary optical positioning device, for example, a differential photocell and a pivoted mirror to guide the spot on the record trace. The mirror is controlled in such case by an electronic regulating circuit. In this known equipment there is a disadvantage that the guiding by the lead screw must be carried out with extreme precision. Mechanical irregularities of the lead screw tend to appear on a noticeable scale in the trace guidance, so that from time to time the range of control of the positioning device is exceeded. The use of such a supplementary positioning device, moreover, is relatively expensive.

It is an object of the present invention to overcome the abovementioned difficulties in the radial guidance of the light spot.

SUBJECT MATTER OF THE PRESENT INVENTION

Briefly, the guidance in the radial direction for the optical pickup is effected exclusively by the positioning forces of an electromagnetic torque transducer operating on an axis parallel to that of the videodisc record which acts on a moveable arm carrying an optical head that includes a deflecting mirror, the torque transducer being operated in response to an electrical input corresponding to deflecting and correction magnitudes.

In a further development of the invention, the photocell operating to detect the light coming from the illuminated trace is mechanically decoupled from the mirror arm so that it follows the radial deflection of the arm but not the correction movements applied to it. In a form of the invention for a transparent video record, the photosensitive element is mounted on a second arm disposed on the other side of the disc and connected to the same torque transducer. In an embodiment for an opaque record disc, a half mirror is used for deflection at the optical head and the photocell is disposed behind the mirror. The focusing of the reading light beam to a light spot may use a focusing lens located near the deflection mirror or may use a deflection mirror with a parabolic surface.

An air jet is preferably used to hold the pickup head off the disc surface and for this purpose a flexible tube is preferably provided to supply the necessary compressed air along the direction of the axis of the torque transducer and along at least part of the length of the arm.

The invention is described by way of example with reference to the accompanying drawings, in which.

Figure 1:
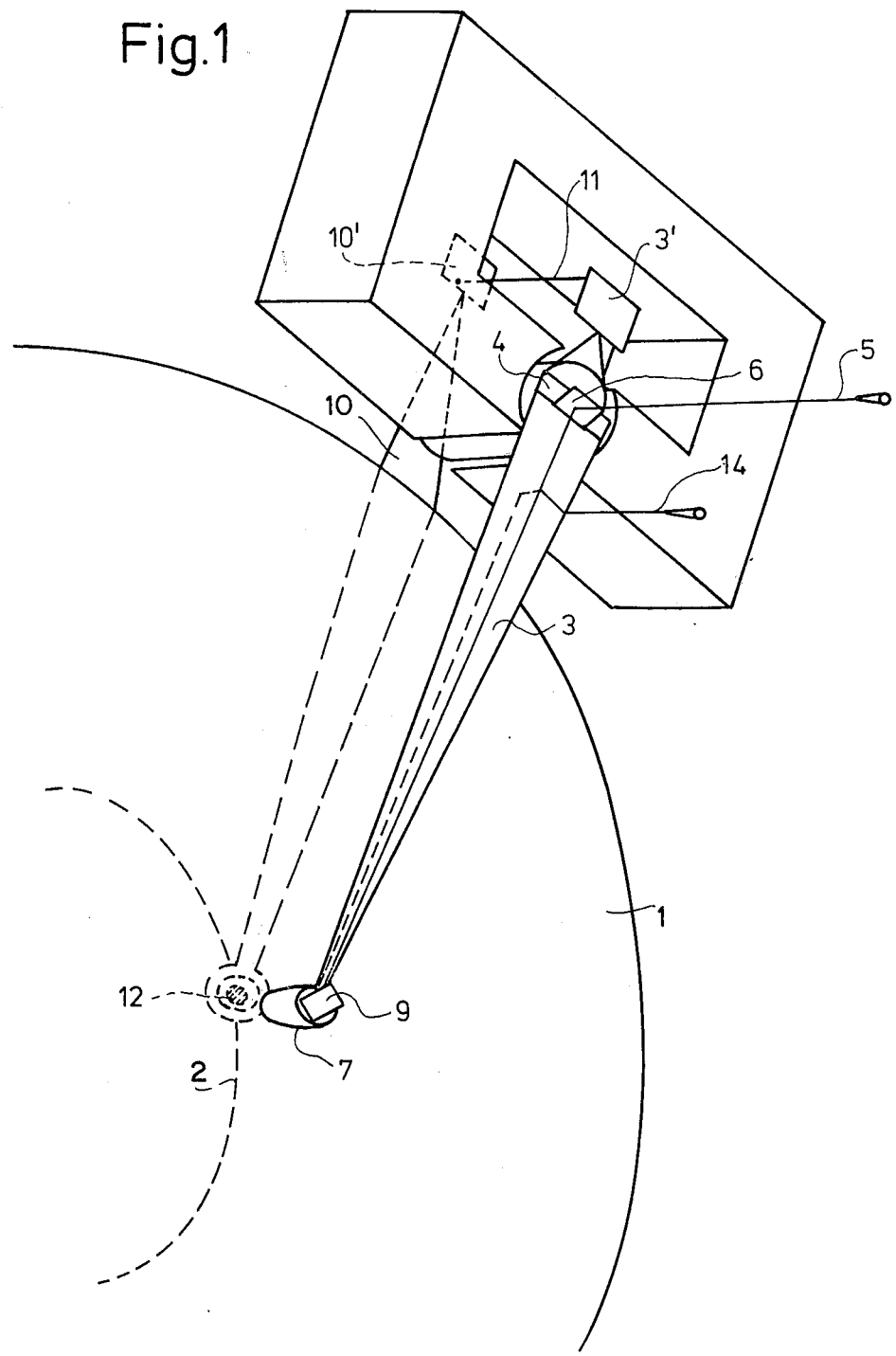
FIG. 1 is a perspective representation of a pickup according to the invention.

FIG. 1 shows a record disc 1 on which signal traces have been recorded, whether spirally or non-spirally. The trace 2, for example, is a perforation trace, such as may be produced by a laser ray burning through a metalized layer. In particular, the trace may describe signals of a television picture or of a partial picture so that a complete picture or a complete part of a picture can be reproduced by a full revolution of the record disc.

Figure 2:
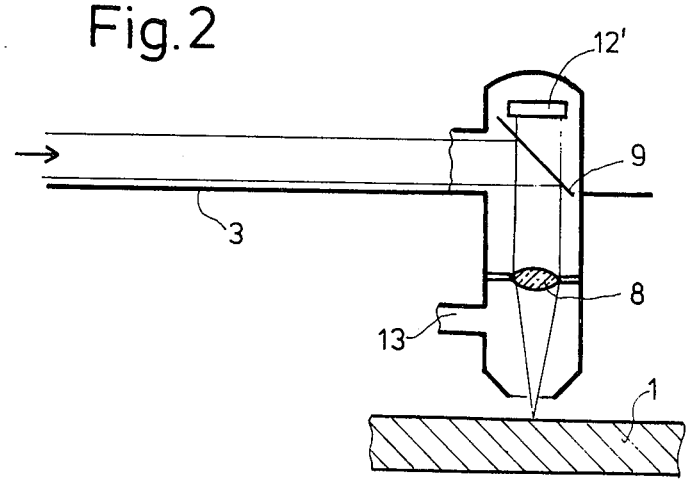
FIG. 2 is a detail, in cross-section, of the pickup head of the equipment shown in FIG. 1.
Figure 3:
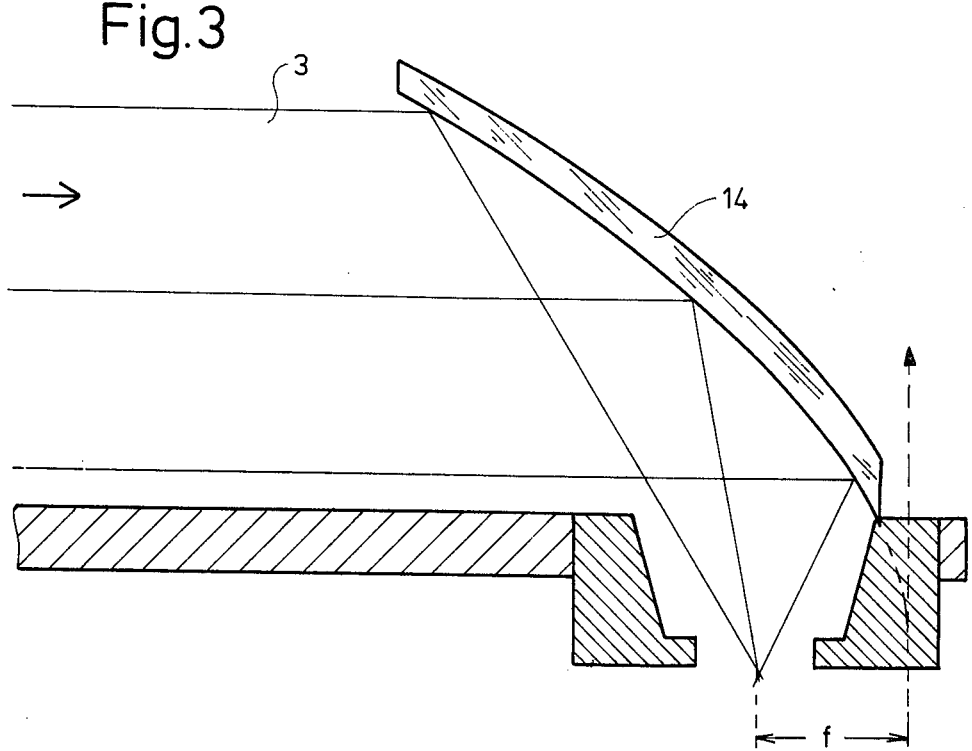
FIG. 3 is a cross-section of another form of pickup head usable in an apparatus generally conforming with FIG. 1.

For deriving a signal from record traces, an apparatus is used that allows the reading (pickup) light beam, which may well be a laser beam, to be moved almost without inertia effects in a direction at right angles to the trace, over a range of movements sufficient to cover all of the traces all the way to the edge of the disc. This apparatus comprises a first arm 3 affixed to a torque-producing transducer 4, for example, a moving coil movement that is mounted in a jeweled or tension band bearing. A light beam 5 issuing from a laser or some other light source is projected into the system along the axis of the torque transducer and deflected to the longitudinal direction of the arm by a mirror 6 or by a prism (not shown). At the extremity of the arm is a focusing optical system 7 that may consist of a microscope objective as shown in FIG. 2 or that may utilize a parabolic mirror as shown in FIG. 3 which simultaneously performs the function of focusing device and the function of the deflection mirror 9 of FIG. 1 and FIG. 2. A counterweight 3' is suitably provided at the other end of the arm that extends a short distance on the other side of the axis of the torque-producing transducer.

If it is desired to read the record by transmitted light rather than by reflected light, a second arm 10 is provided for collecting the light that is caused to pass through the trace by means of a photocell 12 at the end of the arm 10. This second arm is likewise mounted on the moving coil axis and equipped with a counterweight 10', but it is mounted freely moveable and therefore not in fixed relation to the moving coil movement, except that an elastic coupling member 11 connects the two arms 3 and 10. This produces a carrying along of the second arm in response to slow changes of position of the arm 3. Quick changes of position are not transmitted, however, because of the elasticity of the coupling. In this manner, the inertia moment loading the moving coil system is not increased by the supplementary second arm and the drive force of the moving coil system can be lower. The mass of the arm 3, including the focusing optical device 9, can be kept small enough (less than 2 grams) to enable all radial movements of the light spot to be carried out by the arm practically free of inertia effects. That circumstance signifies an appreciable reduction of the mechanical and electrical expense.

Compressed air can be used for maintaining the spacing between the optical objective and the record disc. The compressed air enters the pickup head at 13 (FIG. 2). For supplying the compressed air, a flexible tube is provided that is brought out towards the extremity of the arm by leaving it along the axis of the moving coil system. It is not, however, necessary to hold the air supply channel strictly to the axis of the moving coil system, since the supply tube can be a very flexible one (see the channel 14 in FIG. 1).

The system shown in FIG. 1, equipped with the arm 10 carrying a photocell, is designed for the case in which the disc 1, or at least the trace on the disc, is transparent. If opaque discs are used, as, for example, in the case of discs recorded on both sides, light reflected at the trace can be used. In the latter case, it is effective to use a semi-transparent mirror for the deflection mirror 9 and to locate the photocell behind this mirror. In this connection, see FIG. 2, photocell 12'.

The expense of guiding a pickup along the trace of a record disc is notably reduced by use of the system of the present invention and the dimensions of the electronic portion of the system can also be kept very small. Two separate systems for coarse and fine following of the trace are no longer necessary. Instead, the moving coil system meets the requirements of both coarse and fine guidance. These advantages are favorable to the economy of a videodisc unit which must compete with video tape systems to obtain widespread use. Although the invention has been described with respect to specific embodiments, it will be understood that variations may be made within the inventive concept.

I claim:
1. Optical pickup apparatus for a videodisc record arranged to be rotated on the disc axis, comprising:
   an electromagnetic torque-producing transducer arranged to produce torque on an axis parallel to said disc record axis;
   an arm movable by said torque-producing transducer in a manner for moving the end of said arm farthest from said transducer in a path approximately perpendicular to a record trace on said disc record;
   a focusing light beam projection means on said end of said arm for projecting a spot of light on a record trace on said record;
   means for detecting light from said beam, as modified by said record trace, and
   means for positioning said detecting means near the portion of said record trace illuminated by said light spot, including mechanical partial decoupling means interposed between said positioning means and said arm for preventing transmission of short period correction movements crossways of said record trace to said detecting means except as smoothed gradual corrections while permitting said detecting means to follow a tracking movement, as gradually corrected, produced by said arm.

2. A pickup as defined in claim 1 of a design for use with transparent record discs in which said positioning means comprises a second arm mechanically connected by said partial decoupling means with the same torque-producing transducer as said first-mentioned arm, said second arm carrying at its extremity, farthest from said transducer, a photo element forming part of said detection means.

3. A pickup as defined in claim 2 in which the arm directly movable by said torque-producing transducer and the second arm mechanically connected by said partial decoupling means with the torque-producing transducer are each provided with a counterweight and in which said partial decoupling means comprises a resilient member connecting said arms and having a connection to each of said arms through or near said respective counterweights.

4. A pickup as defined in claim 1 in which said focusing and projection means includes a parabolically curved mirror arranged both to deflect the light beam towards said record disc and to focus a light spot on said record disc.

5. A pickup as defined in claim 1 in which said arm is so constructed as to allow downward exertion of gravitational force on said light beam projection and focusing means, and in which compressed air supply means are provided for bringing compressed air to the end of said arm bearing said light beam projection and focusing means and for allowing said air to escape between said projection and focusing means and said record disc so as to oppose said exertion of gravitational force and to maintain spacing between said projection and focusing means and said record disc.

* * * * *